(12) United States Patent
Betz et al.

(10) Patent No.: US 8,400,759 B2
(45) Date of Patent: Mar. 19, 2013

(54) HIGH-VOLTAGE SWITCHGEAR ASSEMBLY

(75) Inventors: Thomas Betz, Langenselbold (DE);
Carlo Granata, Cavenage d'Adda (IT);
Ilango Gnanadhandapani, Zürich (CH)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/198,219

(22) Filed: Aug. 4, 2011

(65) Prior Publication Data

US 2011/0286153 A1   Nov. 24, 2011

Related U.S. Application Data

(63) Continuation of application No. 11/793,313, filed as application No. PCT/EP2005/013474 on Dec. 15, 2005, now Pat. No. 8,027,152.

(30) Foreign Application Priority Data

Dec. 21, 2004   (DE) .................. 10 2004 061 358

(51) Int. Cl.
*H02B 1/20* (2006.01)
*H02B 7/00* (2006.01)
*H01G 7/02* (2006.01)

(52) U.S. Cl. ........ 361/612; 361/611; 361/619; 361/620; 361/637; 361/639; 361/437

(58) Field of Classification Search .................. 361/612, 361/437, 611, 619, 620, 637, 639
See application file for complete search history.

(56) References Cited

U.S. PATENT DOCUMENTS

| | | | |
|---|---|---|---|
| 4,032,820 A | 6/1977 | Oishi et al. | |
| 4,184,058 A * | 1/1980 | Irik et al. | ...................... 200/501 |
| 4,967,307 A | 10/1990 | Itou et al. | |
| 5,006,958 A | 4/1991 | Sasamori et al. | |
| 5,177,664 A | 1/1993 | Tsuchiya et al. | |
| 5,808,258 A * | 9/1998 | Luzzi | ............................ 218/136 |
| 5,920,052 A * | 7/1999 | Lee | ................................. 218/119 |
| 6,373,015 B1 * | 4/2002 | Marchand et al. | ............ 218/139 |
| 6,664,493 B2 | 12/2003 | Yamada et al. | |
| 7,457,105 B2 * | 11/2008 | Kikukawa et al. | ............ 361/605 |
| 2003/0141281 A1 | 7/2003 | Okabe et al. | |

FOREIGN PATENT DOCUMENTS

| | | |
|---|---|---|
| CH | 3 80 799 | 5/1962 |
| DE | 196 06 213 U1 | 2/1997 |
| DE | 19732487 C1 | 11/1998 |
| DE | 198 07 777 C1 | 11/1999 |
| DE | 298 16 914 | 11/1999 |
| DE | 298 16 914 U1 | 11/1999 |
| EP | 0 708 514 A2 | 4/1996 |
| JP | 55-103023 A | 8/1980 |
| JP | 2001016721 A | 1/2001 |

OTHER PUBLICATIONS

International Search Report (PCT/ISA/210) issued on Apr. 5, 2006, by European Patent Office as the International Searching Authority for International Application No. PCT/EP2005/013474.
German Search Report issued Feb. 24, 2006, for 10 2004 061 358.3.

* cited by examiner

*Primary Examiner* — Jared Fureman
*Assistant Examiner* — Scott Bauer
(74) *Attorney, Agent, or Firm* — Buchanan Ingersoll & Rooney PC

(57) ABSTRACT

The invention relates to a gas-insulated high-voltage switchgear, comprising at least one bus bar with three phase conductors, whereby each phase conductor is connected to the input of a respectively provided bus bar section. The phase conductor and the bus bar section are arranged in a three-phase bus bar module with three single-phase power switches, each arranged in a separate power switch housing and each bus bar section is connected at the output therefrom to a respectively provided power switch.

2 Claims, 4 Drawing Sheets

HIGH-VOLTAGE SWITCHGEAR ASSEMBLY

Figure 1:
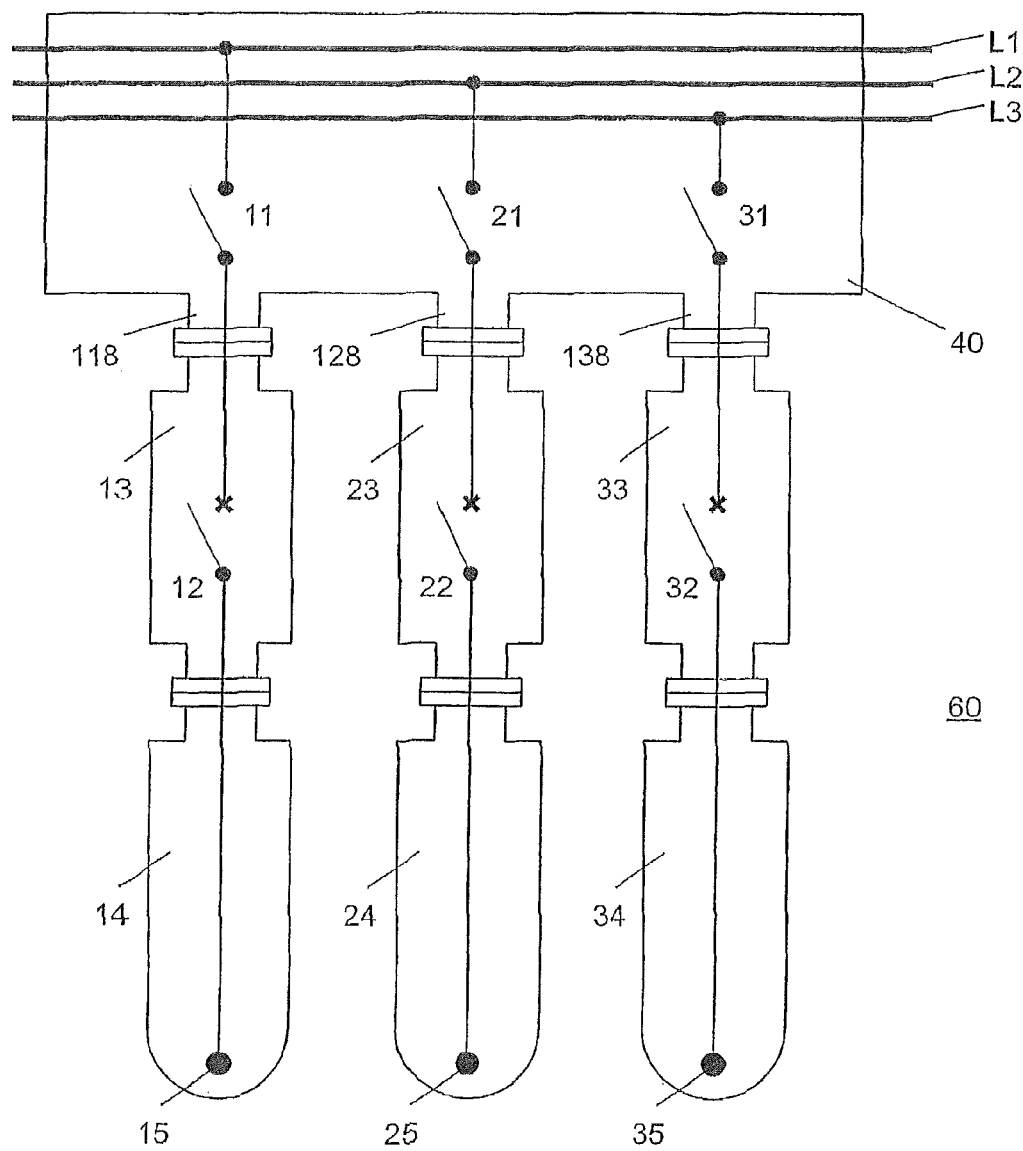

The invention relates to a gas-insulated high-voltage switchgear assembly. The invention further relates to modules for the gas-insulated high-voltage switchgear assembly according to the invention.

It is generally known that gas-insulated high-voltage switchgear assemblies with rated voltages of above 200 kV are generally designed as single-phase-encapsulated systems. In this case, the switching devices, such as circuit breakers, isolators and grounding switches, for example, and further components, such as overhead line connections, for example, are designed to be single-phase and are arranged in separate housings.

Also, the three phase conductors of a busbar are arranged in separate, generally tubular, housings. However, this design results in a comparatively high space requirement.

The invention is based on the object of specifying a high-voltage switchgear assembly having a reduced space requirement.

This object is achieved according to the invention by a high-voltage switchgear assembly having the features mentioned in claim 1.

A gas-insulated high-voltage switchgear assembly according to the invention comprises at least one busbar having three phase conductors, each phase conductor being connected to the input of a busbar isolator associated with it. In this case, the phase conductors and the busbar isolators are arranged in a common three-phase busbar module. The high-voltage switchgear assembly according to the invention further comprises three single-phase circuit breakers, which are each arranged in a separate circuit breaker housing. Each busbar isolator is in this case connected on the output side to in each case one circuit breaker associated with it.

Owing to this arrangement in which the three phase conductors of a busbar and the associated busbar isolators are arranged in a common housing, the space requirement of the high-voltage switchgear assembly is advantageously reduced in comparison with a conventional high-voltage switchgear assembly.

The object is also achieved by a busbar module having the features mentioned in claim 1.

Accordingly, a busbar module according to the invention, in which three phase conductors of a busbar and three busbar isolators are arranged and each phase conductor is connected to the input of the busbar isolator associated with it, has three single-phase interfaces, which are each associated with a busbar isolator.

Such a busbar module allows for a direct and therefore comparatively simple connection of three single-pole circuit breakers. It is not necessary to insert additional modules. The design of the high-voltage switchgear assembly is simplified, and the embodiment is particularly space-saving.

The object is also achieved by a splitter module having the features mentioned in claim 1.

A splitter module according to the invention has at least one three-phase interface and three single-phase interfaces. Three phase conductors are guided from the three-phase interface to in each case the single-phase interfaces within the splitter module.

Such a splitter module allows for a connection of a busbar module with a three-phase interface to three single-phase circuit breakers.

Busbar modules having a three-phase interface are known for switchgear assemblies having a low rated voltage, in particular of from 100 kV to 200 kV. Advantageously, a known busbar module can be used in a high-voltage switchgear assembly according to the invention with the aid of a splitter module.

Furthermore, such a splitter module allows three single-phase circuit breakers to be connected to a three-phase outgoing feeder unit.

Further advantageous configurations of the invention are provided in the dependent claims.

Figure 2:
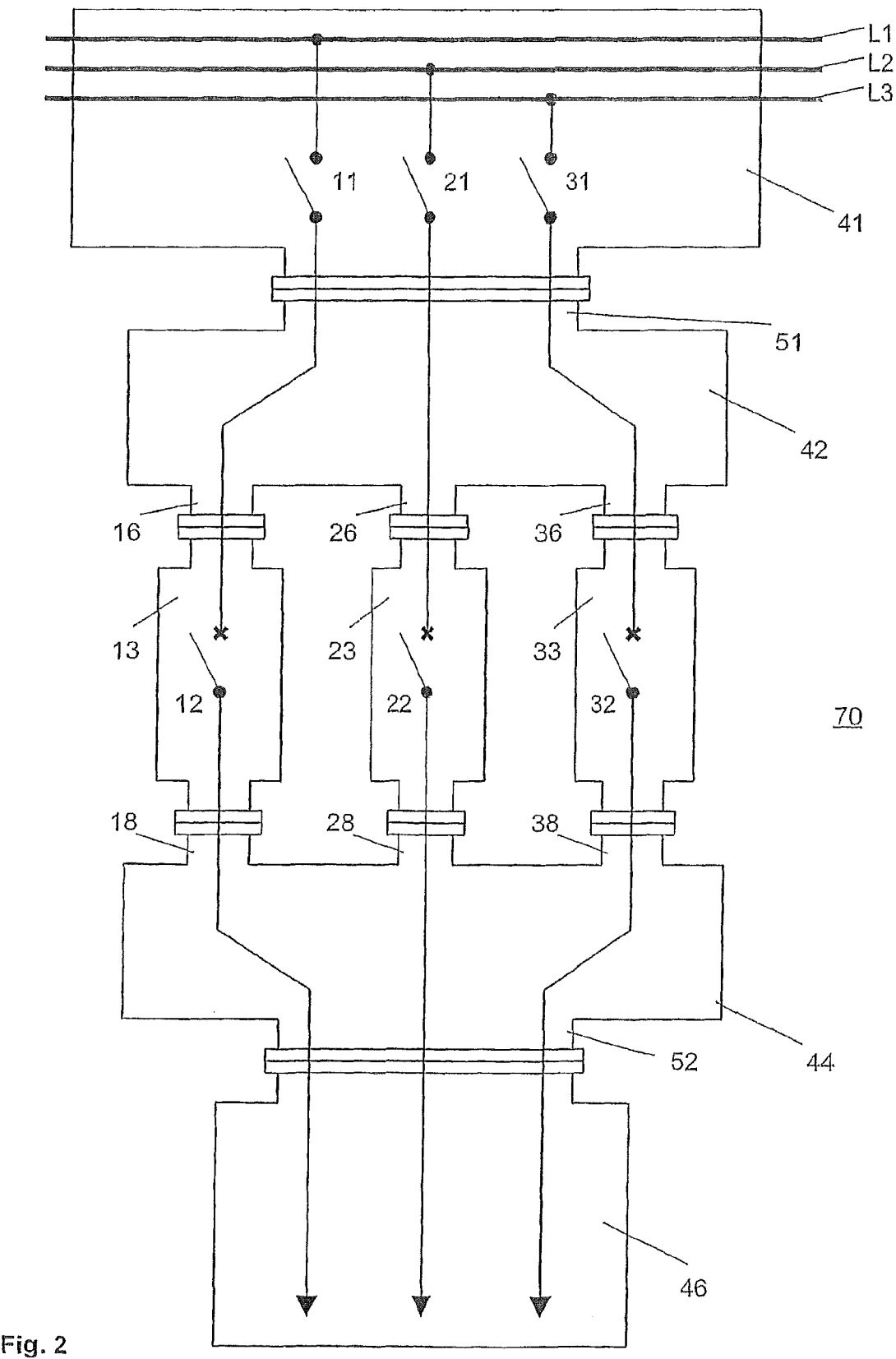
Figure 3:
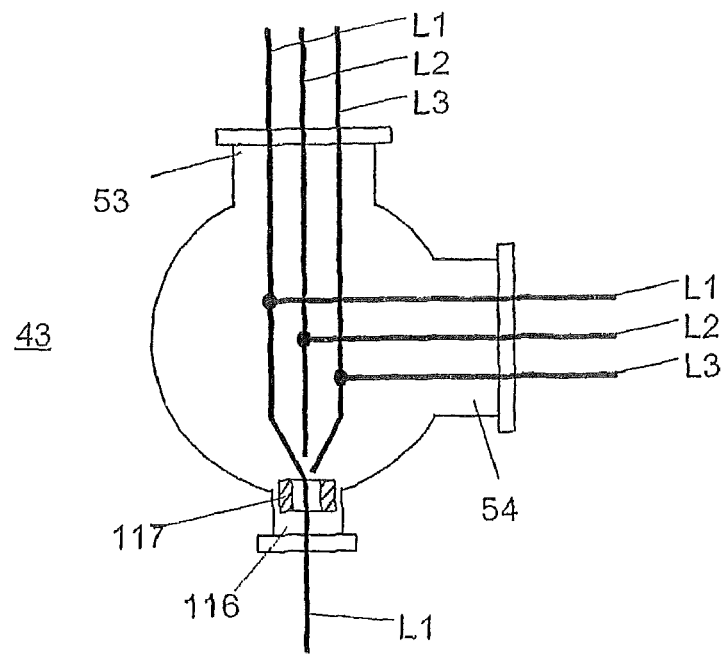
Figure 4:
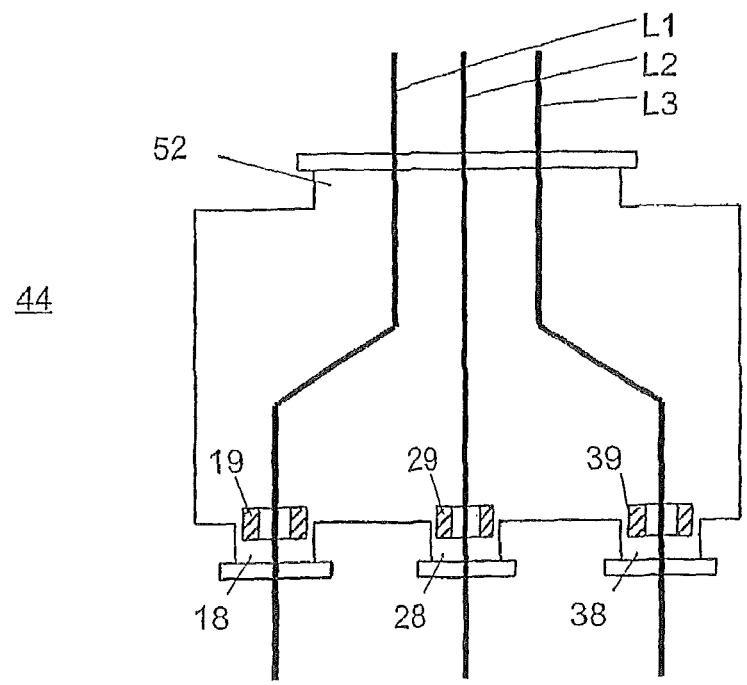
Figure 5:
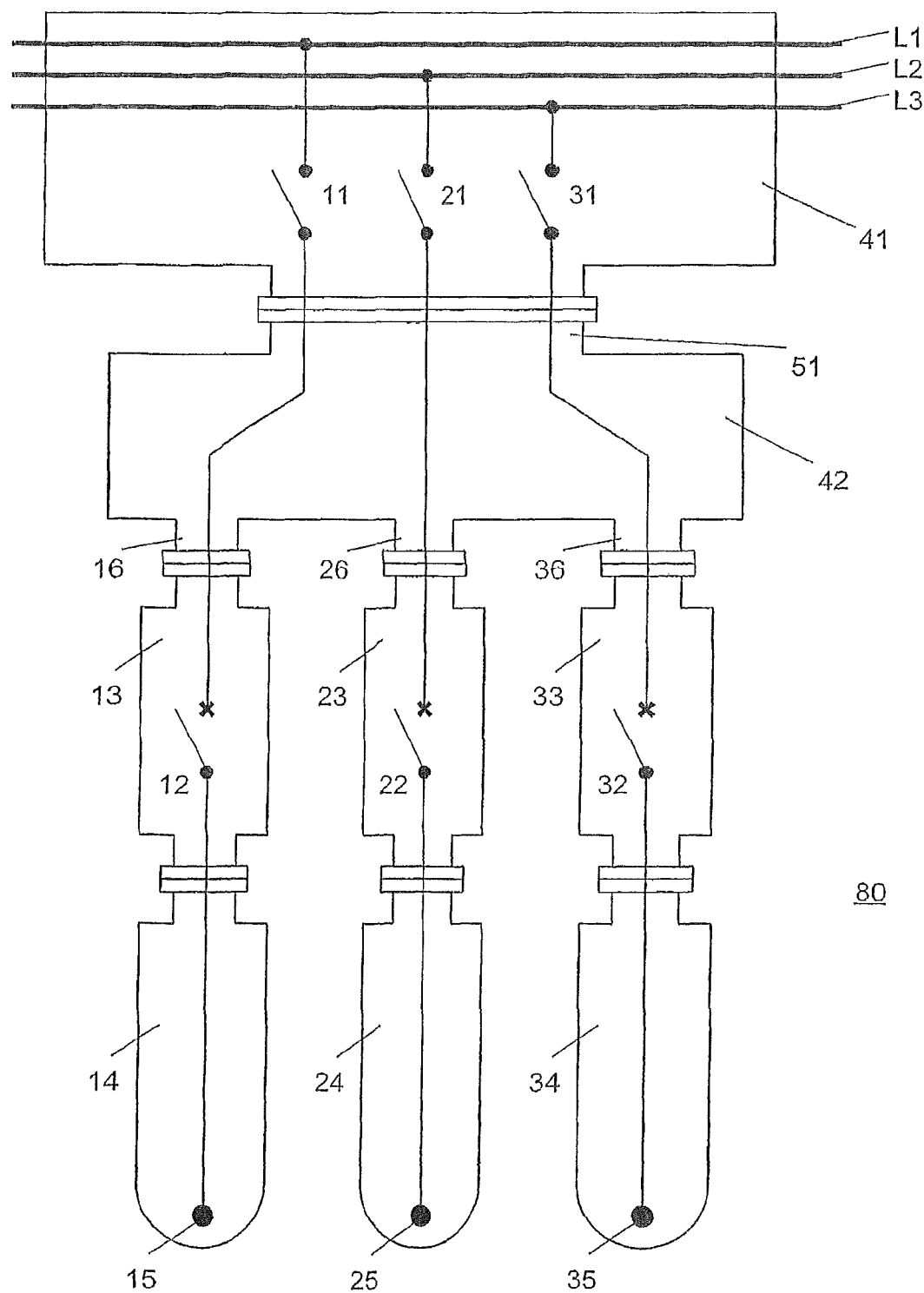

The invention, advantageous configurations and improvements of the invention and further advantages will be explained and described in more detail with reference to the drawings, in which exemplary embodiments of the invention are illustrated and in which:

FIG. 1 shows a circuit diagram of a first outgoing feeder panel of a switchgear assembly according to the invention, FIG. 2 shows a circuit diagram of a second outgoing feeder panel of a switchgear assembly according to the invention, FIG. 3 shows a splitter module for connection to two busbars, FIG. 4 shows a splitter module for connection to an outgoing feeder unit, and FIG. 5 shows a circuit diagram of a third outgoing feeder panel of a switchgear assembly according to the invention.

FIG. 1 shows a circuit diagram of a first three-phase outgoing feeder panel 60 of a three-phase switchgear assembly according to the invention. The switchgear assembly is designed for a rated voltage of approximately from 200 kV to 250 kV. However, use at a lower rated voltage, for example of from 100 kV to 200 kV, or at a higher rated voltage, for example of from 250 kV to 400 kV, is also within the concept of the invention.

The switchgear assembly illustrated is in the form of a metal-encapsulated, gas-insulated high-voltage switchgear assembly. Sulfur hexafluoride (SF6) is used as the insulating gas. Alternatively, nitrogen (N2) or carbon dioxide (CO2) can be used as the insulating gas.

The switchgear assembly has a busbar having three phase conductors L1, L2, L3. The three phase conductors L1, L2, L3 are guided in the region of the first outgoing feeder panel 60 within a first busbar module 40 and further to busbar modules (not illustrated here) of adjacent panels.

The housing of the first busbar module 40 is cylindrical, the phase conductors L1, L2, L3 of the busbar being guided parallel to the mid-axis of the housing of the first busbar module 40.

The first busbar module 40 has three flange connectors 118, 128, 138 for connecting circuit breaker housings or other modules. These flange connectors are arranged on the outside of the cylindrical housing of the first busbar module 40 so as to protrude radially and so as to lie adjacent to one another along a surface line.

Furthermore, the first busbar module 4 has in each case one flange connector (not illustrated here) for connecting in each case one further busbar module or another element, such as a covering cap, for example, at each end side of its cylindrical housing.

A first busbar isolator 11 is associated with the first phase conductor L1 and is connected on the input side to the first phase conductor L1. The busbar isolator 11 is in this case likewise arranged within the first busbar module 40. Correspondingly, the second phase conductor L2 is connected to a second busbar isolator 21, and the third phase conductor L3 is connected to a third busbar isolator 31.

Furthermore, in each case one grounding switch (not illustrated here) is associated with each busbar isolator 11, 21, 31 and is connected to the output of the respective busbar isolator 11, 21, 31. The busbar isolators 11, 21, 31 and the associated grounding switches can in this case be in the form of separate switching devices or in the form of a combined disconnecting and grounding switch. The busbar isolators 11, 21, 31 are in this case in particular in the form of sliding-contact isolators, but a configuration as rotary isolators is also conceivable.

A first circuit breaker 12 is associated with the first busbar isolator 11, and said first busbar isolator is connected to said first circuit breaker on the output side. The first circuit breaker 12 is in this case arranged in a separate, first circuit breaker housing 13, which is fixed on the first flange connector 118 of the first busbar module 40.

Correspondingly, a second circuit breaker 22 is associated with the second busbar isolator 21. In this case, the second circuit breaker 22 is arranged in a separate second circuit breaker housing 23, which is fixed to the second flange connector 128 of the first busbar module 40. A third circuit breaker 32 is associated with the third busbar isolator 31. The third circuit breaker 32 is arranged in a separate, third circuit breaker housing 33, which is fixed to the third flange connector 138 of the first busbar module 40.

The connecting conductors between the busbar isolators 11, 21, 31 and the circuit breakers 12, 22, 32 are in this case each guided separately through in each case one of the three flange connectors of the first busbar module 40.

In addition, in each case one intermediate piece can be inserted between the circuit breaker housings 13, 23, 33 and the three flange connectors 118, 128, 138 of the first busbar module 40. Such an intermediate piece is in the form of a branch piece, for example, and therefore allows the connection of two or more busbars. In this way, the circuit breakers can be connected comparatively easily to a plurality of busbars.

A first outgoing feeder housing 14, which is split into a plurality of segments (not illustrated here) which are connected in series, adjoins the first circuit breaker housing 13. In this case, further components (not illustrated here), such as an outgoing feeder isolator and an outgoing feeder grounding switch, for example, are arranged in the segments of the first outgoing feeder housing 14. The first outgoing feeder housing 14 has a first cable connection point 15, to which a high-voltage cable can be connected.

Correspondingly, the second circuit breaker housing 23 is connected to a second outgoing feeder housing 24, which has a second cable connection point 25, and the third circuit breaker housing 33 is connected to a third outgoing feeder housing 34 with a third cable connection point 35.

Voltage transformers (not illustrated here) are arranged on the outgoing feeder housings 14, 24, 34, which voltage transformers are connected to the corresponding phase conductors L1, L2, L3 and measure their voltage to ground.

Instead of the cable connection points 15, 25, 35, outdoor bushings for connection to cables of an overhead line can also easily be provided. Connection elements for connecting a transformer are also conceivable and within the concept of the invention.

FIG. 2 shows a circuit diagram of a second three-phase outgoing feeder panel 70 of a three-phase switchgear assembly according to the invention. In the text which follows, the same reference symbols as in FIG. 1 are used for identical components. In a similar manner to as in FIG. 1, the three phase conductors L1, L2, L3 of a busbar run within a second, cylindrical busbar module 41 parallel to its mid-axis, and the busbar isolators 11, 21, 31, which are associated with the phase conductors L1, L2, L3, are arranged within the housing of the second busbar module 41.

The second busbar module 41 has a radially protruding flange connector, which is arranged on the outside of the housing of said second busbar module and to which a first splitter module 42 is fixed.

Furthermore, the second busbar module 41 has in each case one flange connector (not illustrated here) for connecting in each case one further busbar module or another element, such as a covering cap, for example, at each end side of its cylindrical housing.

The first splitter module 42 has a first three-phase interface 51 by means of which it is connected to the outputs of the busbar isolators 11, 21, 31. This first three-phase interface 51 of the first splitter module 42 also comprises a flange connector, by means of which the first splitter module 42 is connected, for example screwed, to the flange connector of the second busbar module 41.

The first splitter module 42 also has three single-phase interfaces 16, 26, 36, to which in each case one single-phase circuit breaker 12, 22, 32 is connected. The connection between the housing of the first splitter module 41 and the circuit breaker housings 13, 23, 33 is also produced by means of flange connectors.

All of the switching devices, such as the circuit breakers 12, 22, 32, the busbar isolators 11, 21, 31 or grounding switches, for example, are arranged outside of the housing of the first splitter module 42. Only rigid, electrical conductors are guided in each case from the single-phase interfaces 16, 26, 36 to the first three-phase interface 51 in the interior of the splitter module 42.

On the outgoing feeder side, a third splitter module 44 is connected to the circuit breaker housings 13, 23, 33. The third splitter module 44 has, for this purpose, three single-phase interfaces 18, 28, 38, by means of which it is connected to in each case one of the circuit breaker housings 13, 23, 33. The third splitter module 44 furthermore has a second three-phase interface 52, to which a three-phase outgoing feeder unit 46 is connected.

The outgoing feeder unit 46 is split into a plurality of segments (not illustrated here) which are connected in series and in which further components (not illustrated here), such as three outgoing feeder isolators, three outgoing feeder grounding switches and three high-speed grounding switches, for example, are arranged. A three-phase voltage transformer (not illustrated here), which measures the voltages of the conductors with respect to one another and/or the voltages of the conductors with respect to ground, is fixed to the outgoing feeder unit 46.

The outgoing feeder unit 46 furthermore comprises, on the outgoing feeder side, a three-phase connection point (not shown here) having three cable connection points for connecting a high-voltage cable. Likewise, a three-phase outdoor bushing for connection to cables of an overhead line or a three-phase connection element for connecting a transformer are also conceivable.

As an alternative to the three-phase connection point, which is laid on the outgoing feeder side, three single-phase connection points can also be realized, for example for connecting high-voltage cables.

Switching devices, such as the circuit breakers 12, 22, 32, outgoing feeder isolators or outgoing feeder grounding switches, for example, are arranged outside of the housing of the third splitter module 44. Only rigid electrical conductors are guided in each case from the single-phase interfaces 18, 28, 38 to the second three-phase interface 52 in the interior of the third splitter module 44.

FIG. 3 illustrates a second splitter module 43 having a third three-phase interface 53 and a fourth three-phase interface 54.

The three-phase interfaces 53, 54 are used for connection to in each case one busbar. The second splitter module 43 in this case has a cylindrical housing, whose mid axis runs at right angles to the plane of the drawing.

The third three-phase interface 53 is fitted to the outwardly pointing side of this cylindrical housing. The third three-phase interface 53 comprises, in addition to the three electrical phase conductors L1, L2, L3, a flange connector for fixing it to a second busbar module 41 (not shown here). The three electrical phase conductors L1, L2, L3 pass through the flange connector of the third three-phase interface 53 and can be connected to busbar isolators of a busbar module.

Furthermore, the fourth three-phase interface 54, which likewise has three electrical phase conductors L1, L2, L3 and a flange connector for fixing it to a busbar module (not shown here), is attached to the outwardly pointing side of the cylindrical housing of the second splitter module 43. The three electrical phase conductors L1, L2, L3 pass through the flange connector of the fourth three-phase interface 54 and can be connected to busbar isolators of a busbar module.

Furthermore, a seventh single-phase interface 116, an eighth single-phase interface and a ninth single-phase interface are located on the outwardly pointing side of the cylindrical housing of the second splitter module 43, in this example diametrically opposite the third three-phase interface 53. These three single-phase interfaces each have a flange connector for fixing in each case one circuit breaker housing (not shown here). Only the seventh single-phase interface 116 is visible in the illustration shown; the eighth single-phase interface and the ninth single-phase interface are hidden by the seventh single-phase interface 116.

The first electrical phase conductor L1 passes through the flange connector of the seventh single-phase interface 116 and can be connected to a single-phase circuit breaker.

Correspondingly, the second electrical phase conductor L2 passes through the flange connector of the eighth single-phase interface (not visible here) and can be connected to a single-phase circuit breaker, and the third electrical phase conductor L3 passes through the flange connector of the ninth single-phase interface (not visible here) and can likewise be connected to a single-phase circuit breaker.

A seventh current transformer 117, which is arranged within the housing of the second splitter module 43 in the vicinity of the seventh single-phase interface 116 and surrounds the first phase conductor L1, is associated with the seventh single-phase interface 116.

Correspondingly, an eighth current transformer, which is arranged within the housing of the second splitter module 43 in the vicinity of the eighth single-phase interface and surrounds the phase conductor L2, is associated with the eighth single-phase interface. A ninth current transformer, which is arranged within the housing of the second splitter module 43 in the vicinity of the ninth single-phase interface and surrounds the phase conductor L3, is associated with the ninth single-phase interface.

In the illustration shown, that section of the phase conductor L2 which runs through the eighth single-phase interface and that section of the phase conductor L3 which runs through the ninth single-phase interface are not visible, since they are hidden by the first phase conductor L1. Likewise, the eighth current transformer and the ninth current transformer are hidden by the seventh current transformer 117.

In this example, the second splitter module 43 has two three-phase interfaces 53, 54. However, it is also conceivable for one splitter module to have only one or more than two, for example three, three-phase interfaces.

FIG. 4 illustrates the third splitter module 44 for connection to an outgoing feeder unit. The third splitter module 44 has a second three-phase interface 52, which has, in addition to the three-electrical phase conductors L1, L2, L3, a flange connector for fixing an outgoing feeder unit (not shown here).

Furthermore, the third splitter module 44 has a fourth single-phase interface 18, a fifth single-phase interface 28 and a sixth single-phase interface 38. The three single-phase interfaces 18, 28, 38 each comprise a flange connector for fixing in each case one circuit breaker housing (not shown here).

A conductor section of the first phase conductor L1 passes through the flange connector of the second three-phase interface 52 and is guided through the interior of the housing of the third splitter module 44 to the fourth single-phase interface 18, which it likewise passes through.

A conductor section of the second phase conductor L2 passes through the flange connector of the second three-phase interface 52 and is guided through the interior of the housing of the third splitter module 44 to the fifth single-phase interface 28, which it likewise passes through. Correspondingly, a conductor section of the third phase conductor L3 passes through the flange connector of the second three-phase interface 52 and is guided through the interior of the housing of the third splitter module 44 to the sixth single-phase interface 38, which it likewise passes through.

A fourth current transformer 19, which is associated with the fourth single-phase interface 18, is arranged within the third splitter module 44 in the vicinity of the fourth single-phase interface 18 and surrounds the first phase conductor L1.

Correspondingly, a fifth current transformer 29, which surrounds the phase conductor L2, is associated with the fifth single-phase interface 28, and a sixth current transformer 39, which surrounds the phase conductor L3, is associated with the sixth single-phase interface 38.

In the example shown, the second three-phase interface 52 is arranged on that side of the housing of the third splitter module 44 which lies diametrically opposite the single-phase, interfaces 18, 28, 38. Other arrangements are also conceivable. For example, the three-phase interface 52 can be arranged such that its mid-axis forms a right angle with the mid-axes of the single-phase interfaces 18, 28, 38.

FIG. 5 illustrates a circuit diagram of a third three-phase outgoing feeder panel 80 of a three-phase switchgear assembly according to the invention. The third outgoing feeder panel 80 in this case has a second busbar module 41. A radially protruding flange connector, to which a first splitter module 42 is fixed by means of the flange connector of its first three-phase interface 51, is attached to the outside of the cylindrical housing of the second busbar module 41.

In each case one single-phase circuit breaker 12, 22, 32 is connected to the single-phase interfaces 16, 26, 36 of the first splitter module 42. In this case, in each case one single-phase outgoing feeder housing 14, 24, 25 is connected to the circuit breaker housings 13, 23, 33 of the single-phase circuit breakers 12, 22, 32.

| List of reference symbols | | | |
|---|---|---|---|
| L1: | First phase conductor | 31: | Third busbar isolator |
| L2: | Second phase conductor | 32: | Third circuit breaker |
|  |  | 33: | Third circuit breaker housing |
| L3: | Third phase conductor |  |  |
| 11: | First busbar isolator | 34: | Third outgoing feeder housing |
| 12: | First circuit breaker |  |  |
| 13: | First circuit breaker housing | 35: | Third cable connection point |

List of reference symbols

| | | | |
|---|---|---|---|
| 14: | First outgoing feeder housing | 36: | Third single-phase interface |
| 15: | First cable connection point | 37: | Third current transformer |
| 16: | First single-phase interface | 38: | Sixth single-phase interface |
| 17: | First current transformer | 39: | Sixth current transformer |
| 18: | Fourth single-phase interface | 138: | Third flange connector |
| 19: | Fourth current transformer | 40: | First busbar module |
| 116: | Seventh single-phase interface | 41: | Second busbar module |
| | | 42: | First splitter module |
| 117: | Seventh current transformer | 43: | Second splitter module |
| 118: | First flange connector | 44: | Third splitter module |
| | | 46: | Outgoing feeder unit |
| 21: | Second busbar isolator | 51: | First three-phase interface |
| 22: | Second circuit breaker | 52: | Second three-phase interface |
| 23: | Second circuit breaker housing | 53: | Third three-phase interface |
| 24: | Second outgoing feeder housing | 54: | Fourth three-phase interface |
| 25: | Second cable connection point | 60: | First outgoing feeder panel |
| 26: | Second single-phase interface | 70: | Second outgoing feeder panel |
| 27: | Second current transformer | 80: | Third outgoing feeder panel |
| 28: | Fifth single-phase interface | | |
| 29: | Fifth current transformer | | |
| 128: | Second flange connector | | |

The invention claimed is:

1. A busbar module for a gas-insulated high-voltage switchgear assembly, comprising:
 a housing;
 three single-phase interfaces for the housing;
 three phase conductors;
 three busbar isolators, each busbar isolator having a corresponding input and a corresponding output;
 three circuit breaker housings; and
 three single-phase circuit breakers,
 wherein:
  the three phase conductors and three busbar isolators are arranged in the housing, each phase conductor being connected to the input of the respective busbar isolator associated with the phase conductor;
  each single-phase interface is associated with a corresponding one of the busbar isolators at the output of the corresponding one of the busbar isolators; and
  the three single-phase circuit breakers are each arranged in a respective separate circuit breaker housing among the three circuit breaker housings, each single-phase circuit breaker including a corresponding input side and a corresponding output side, each busbar isolator being connected at the output of the busbar isolator to a respective one of the three single-phase circuit breakers.

2. The busbar module as claimed in claim 1, wherein the phase conductors are configured to be connected to the phase conductors of two further busbar modules.

* * * * *